United States Patent
Gunnarson et al.

(10) Patent No.: US 9,864,880 B1
(45) Date of Patent: *Jan. 9, 2018

(54) DATA ENCRYPTION AND ISOLATION

(75) Inventors: Tomas Gunnarson, Montreal (CA); Sigurdur Asgeirsson, Beaconsfield (CA)

(73) Assignee: Google Inc., Mountain View, CA (US)

(*) Notice: Subject to any disclaimer, the term of this patent is extended or adjusted under 35 U.S.C. 154(b) by 508 days.

This patent is subject to a terminal disclaimer.

(21) Appl. No.: 13/342,306

(22) Filed: Jan. 3, 2012

Related U.S. Application Data (63) Continuation of application No. 11/771,728, filed on Jun. 29, 2007.

(60) Provisional application No. 60/818,142, filed on Jun. 29, 2006.

(51) Int. Cl.
*H04L 29/06* (2006.01)
*G06F 21/80* (2013.01)
*G06F 21/62* (2013.01)
*G06F 21/78* (2013.01)

(52) U.S. Cl.
CPC .......... *G06F 21/80* (2013.01); *G06F 21/6227* (2013.01); *G06F 21/78* (2013.01); *G06F 2221/2117* (2013.01)

(58) Field of Classification Search
CPC ................................. G06F 21/80; G06F 21/78
USPC ............... 713/150, 156, 164, 165, 176, 193; 726/26, 27, 30

See application file for complete search history.

(56) References Cited

U.S. PATENT DOCUMENTS

| | | |
|---|---|---|
| 7,346,560 B1 | 3/2008 | Tenorio |
| 2002/0016922 A1 | 2/2002 | Richards et al. |
| 2004/0193905 A1* | 9/2004 | Lirov .................... G06F 21/606 713/193 |
| 2005/0044366 A1* | 2/2005 | Pucheral ........... G06F 17/30477 713/172 |
| 2005/0120233 A1* | 6/2005 | Halcrow ................ G06F 21/46 713/193 |
| 2005/0147246 A1* | 7/2005 | Agrawal ............... H04L 9/0662 380/44 |
| 2005/0166046 A1* | 7/2005 | Bellovin ............... H04L 9/3218 713/165 |
| 2005/0226059 A1 | 10/2005 | Kavuri et al. |
| 2005/0278527 A1* | 12/2005 | Liao .................... G06F 21/6209 713/165 |
| 2006/0101285 A1* | 5/2006 | Chen .................... G06F 21/602 713/193 |
| 2006/0224519 A1* | 10/2006 | Ahn ...................... H04L 63/061 705/57 |
| 2006/0248039 A1* | 11/2006 | Brooks ............. G06F 17/30613 |

* cited by examiner

*Primary Examiner* — Kambiz Zand
*Assistant Examiner* — Suman Debnath
(74) *Attorney, Agent, or Firm* — Fish & Richardson P.C.

(57) ABSTRACT

A method of storing data for a computer application in a shared data store is disclosed. The method includes receiving a data submission from the computer application, receiving an encryption key from the computer application, encrypting the submitted data using the encryption key, and storing the data in encrypted form in a data store that is accessible to the computer application and other independent applications, and indexing the stored data in a shared index.

18 Claims, 7 Drawing Sheets

DATA ENCRYPTION AND ISOLATION

CLAIM OF PRIORITY

This application is a continuation of and claims priority to U.S. application Ser. No. 11/771,728, filed Jun. 29, 2007, which claims priority to U.S. Application Ser. No. 60/818,142, filed on Jun. 29, 2006, the entire contents of each of which are incorporated herein by reference.

TECHNICAL FIELD

The features discussed in this document relate to security for information stored on a computer.

BACKGROUND

Storing, indexing, and retrieving data efficiently and effectively can be hard work. That is especially true when the amount of the data is massive, and fast access to the data is needed. Additional difficulties may arise when different, independent applications, or programs, need to access the same data for various reasons.

Certain computer applications do a good job at storing, indexing, and retrieving data efficiently and effectively. For example, the well-known Google Desktop (GD) can index, cache, and search content on a user's computer. The GD also has an application programming interface (API) that allows various independent applications to send content to the GD engine for indexing and storage. For example, traditional applications may include extensions that permit the sending of data to the GD. Likewise, smaller applications in the form of so-called gadgets, may appear as docked or floating objects on a video display and may provide a computer user with specific information. These applications may also send data to the GD engine or receive data back from it.

The applications may take various forms. For example, a program may permit easy searching and display of e-mails held by a system. Another application may obtain data over the internet and display that data—such as in a gadget that shows a local up-to-date weather forecast. Yet another application may permit easy access to personal finance data to the user of a computer.

SUMMARY

This document describes systems and methods for storing information in a common data store, or repository, in a relatively secure manner while still permitting access to the data store by multiple, independent applications. In general, applications may provide encryption keys to a manager of the data store when submitting information, and may supply corresponding keys when attempting to access the information. The data store may encrypt the information before storing and indexing it, so that other applications, which do not have the relevant key, cannot access the data. User credentials may also be checked to ensure that the user who stored the information is the same user seeking the information, even if that person is using the same application.

Such approaches may advantageously provide one or more features. For example, an author of an application may take advantage of a robust and well-written indexing and search system, without having to produce such a system on their own. The author may at the same time provide security for data relating to the application, from access by other applications that are using the same system. In addition, the stored information, if encrypted, may provide additional security from hacking or from loss of a computing device. Such features are also beneficial to users, as the users may have access to better searching and indexing performance, but may have their data relating to one application isolated from another application.

In one implementation, a method of storing data for a computer application in a shared data store is disclosed. The method comprises receiving a data submission from the computer application, receiving an encryption key from the computer application, encrypting the submitted data using the encryption key, and storing the data in encrypted form in a data store that is accessible to the computer application and other independent applications, and indexing the stored data in a shared index. The method may also include registering the application with a central qualification system. In addition, the method may include verifying with a central qualification system that the application is registered.

In some aspects, the received data submission may contain application data and the encryption key. The encryption key may be metadata of the data submission, and may be generated by the computer application.

In another implementation, a method of accessing data from a common data store is disclosed. First data in the common data store is unencrypted and second data in the common data store is encrypted by a key specific to a first application. The method comprises receiving a query for the common data store from an application, searching an index associated with the common data store using the query, to return one or more search results, determining whether the query is accompanied by an encryption key, and applying the encryption key to decrypt one or more of the one or more search results.

In yet another implementation, a data storage system is disclosed. The system comprises a central data store containing data submitted by a plurality of independent computer applications, and containing encrypted data associated with a first application and non-encrypted data associated with a second application that is independent of the first application, an index containing indexed data associated with the data store, and a search engine adapted to receive a query and an encryption key from an application, to identify indexed data related to the query, and to decrypt data in the central data store associated with the identified indexed data. The search engine may be further configured to identify a user credential and to decrypt only data associated with the user credential. Also, the search engine may be further configured to decrypt only data associated with a key associated with the query.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
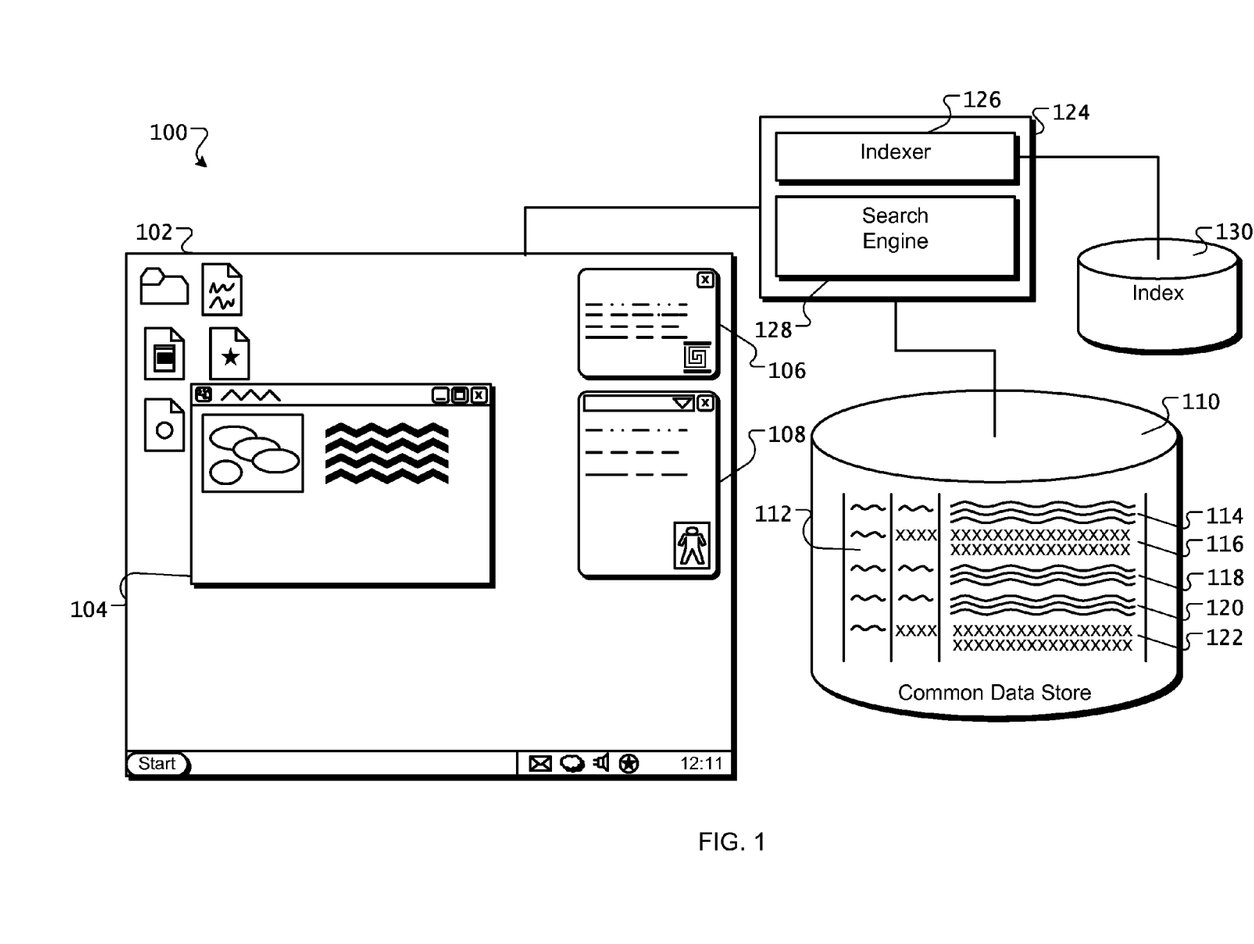
FIG. 1 shows the relation of structures in a data storage and retrieval system.

FIG. 1 shows the relation of structures in a data storage and retrieval system 100. The system 100 centers around display 102, such as a graphical user interface display in a windowed operating system. Display 102 presents a number of computer applications, such as stand-alone application 104, and mini applications 106, 108. The applications 104, 106, 108, may be operated from executable program code stored on a computer associated with display at 102.

Standalone application 104 may take many different forms, and is best represented by traditional computer applications such as productivity applications, personal finance applications, web browsers, graphics programs, and other applications. Mini applications 106, 108 may also take many different forms such as applications known as Google gadgets. Mini applications 106, 108 may be docked to one side of display 102, or may be allowed to be moved on display 102. In general, mini applications 106, 108 may be directed toward specific tasks, such as showing current time, providing targeted search results, providing formatted information obtained from the Internet (e.g., stock prices, weather reports, news, and other information), and a number of other tasks that are useful to a user of system 100, and which are most beneficial if persistently displayed in a small area.

The applications 104, 106, 108, may, in certain circumstances, access data held in a common data store 110, such as a large data repository. The common data store 110 may be a shared storage structure or repository in which various applications may place data for indexing and searching. The stored data may take many different forms, and in one implementation, may include a field for the stored data itself, and a number of metadata fields relating to the stored data. For example, the stored data may be in the form of an XML document, and the metadata may describe particular parameters of the document, such as the author, the application associated with the data, the format of the data, the size of the data, whether the data is encrypted, and other similar information. The stored data may also alternatively take other forms, such as HTML format, plaintext, image files, and other forms.

A common data manager 124 controls access by applications 104, 106, 108 to common data store 110. Applications 104, 106, 108 may make requests to common data manager 124, and may thereby cause common data manager 124 to query common data store 110 in an appropriate manner. An index 130 may also be a associated with common data manager 124, and common data manager 124 may query the index 130. The index 130 may be an index of common data store 110, arranged in a manner which improves and speeds searching. The index 130 may be structured in a variety of appropriate manners, and the particular structure of the index 130 is not critical.

Indexer 126 in common data manager 124 analyzes content in common data store 110 to generate index information for storage in index 130. Indexer 126 may constantly or periodically analyze information in common data store 110 that has recently changed, and may update the index 130 to reflect changes in the data.

Search engine 128 in common data manager 124 receives queries from applications 104, 106, 108, and produces appropriate responses. Search engine 128 may be directed to analyze information in index 130 to determine a match or matches for a query from applications 104, 106, 108, and may then access data in common data store 110 and return it for use by applications 104, 106, 108.

For example, mini application 108 may be an e-mail reader gadget. The mini application 108 may permit a user to enter a search term, and have system 100 return all e-mails stored or cached in common data store 110 that contain the search term. The returned information may be cached information, which may then be linked back to native storage of the e-mail in a noncommon data store. Thus, for example, information in common data store 110 may be a copy or shadow of data that is stored elsewhere in a non-shared manner. In such a manner, applications 104, 106, 108 may take advantage of superior indexing and retrieval features associated with common data store 110, and may still maintain data in its native form.

As will be explained in more detail below, data in common data store 110 may be stored in un-encrypted or encrypted form. For example, if a developer of application 104 wishes to provide its users with greater functionality, but also wishes to prevent other applications from accessing data that it has written to common data store 110, application 104 may provide the data to data manager 124 along with an indication that the data should be encrypted when stored.

A database 112 and common data store 110 is shown in a simplified form for clarity. The database 112 is shown to contain five entries 114-122. Each entry may be associated with a data package, or event, that has been provided to data manager 124 by an application. In this example, each entry is shown to have three distinct fields. A first field in the left-most column represents a unique identifier for an entry (such as an ID number), so that data manager 124 may readily distinguish one entry from another.

The second column represents an encryption key associated with an entry. The key may take any appropriate form, such as a string of characters, a number, or a set of bytes. In general, the key is generated by one of applications 104, 106, 108, and is to be known only by the generating application and data manager 124. Where an entry is not encrypted, the key field may be blank or filled with an arbitrary value that is known to the data manager 124, so that data manager 124 understands that decryption is not necessary.

Entry 114 is not encrypted. It may be, for example, an HTML file associated with a web browsing history of a user associated with system 100. Entry 116 he is encrypted, as shown by a series of x's. The encryption may occur by a variety of known methods, and may take a variety of known formats. For example, each term in the data portion of an entry may be converted to a corresponding encrypted term. In this manner, searches may occur on encrypted and unencrypted data by searching the un-encrypted data using a search term, and searching the encrypted data by using an encrypted version of the search term. Entry 116 may be, for example, related to private information of a user. For example, entry 116 may be an HTML file associated with a web browsing session for a confidential portion of a user's work.

Entry 118 may again be an encrypted entry. It may include, for example, cached information relating to an e-mail stored on system 100, or other similar information. Likewise, entry 120 may be another unencrypted cached e-mail message.

Entry 122 is, like entry 116, encrypted. As shown, entries 116 and 122 are both represented by a series of x's, showing that they were encrypted by the same application with the same key. Other entries (not shown) may be stored, as encrypted, using a key from another application.

In operation, an application, such as application 104 having an extension that allows it to work with data manager 124, supplies data to be stored in common data store 110 for later searching and retrieval. Application 104 may provide the information along with an encryption key that has been generated by application 104. The particular form of the key is not critical.

Application 104 may also store a copy of the key for later access to the data. Data manager 124 may then receive the submission, either in one group or in multiple groups, and may store the data in an encrypted format associated with the key.

Application 104 may later wish to search for information relating to the supplied data. In such a situation, application 104 may provide a query to data manager 124, and may also provide the key that was previously provided, or an associated key. Data manager 124 may then search data in common data store 110 using the query, and may return relevant information to application 104. If encrypted entries are identified as relevant, data manager 124 may decrypt the entries before providing the data to application 104.

Also, data identified by data manager 104 may be checked to ensure that it is associated with a user making the query. For example, credentialing information may be obtained from an operating system or application, and may be recorded when data is stored in common data store 110, to record the proper person to access the data. When a query is made, credentialing information may again be obtained for the user making the query, so that that information may be compared with the initial credentialing information of the person who caused the data to be added.

Common data store 110 may avoid storing keys, and in particular unencrypted keys, where possible. In this manner, applications 104, 106, 108, may be made responsible for securing their own keys. Thus, common data store 110 may provide additional security for data.

Figure 2:
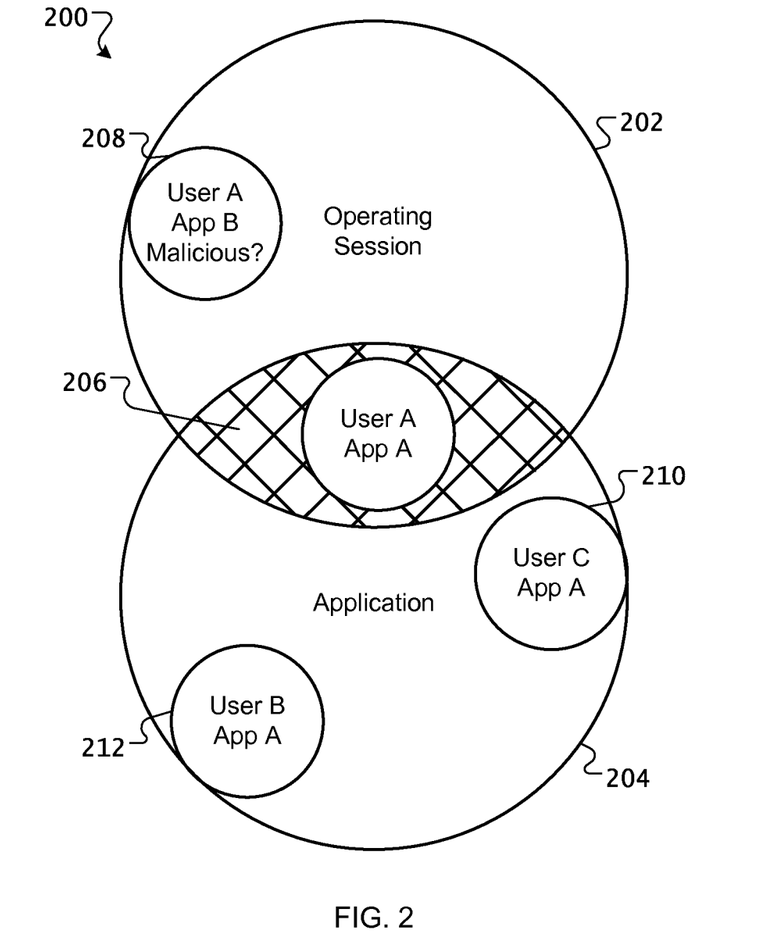
FIG. 2 is a conceptual diagram showing the isolation of data associated with particular applications and users.

FIG. 2 is a conceptual diagram showing the isolation of data associated with particular applications and users. In general, the techniques described here may be used to permit intermingled storage of data in a common data store, along with general indexing of the data, but to also permit individualized searching and retrieval of particular data, without making that data available to other applications.

The figure is illustrated for clarity as a Venn diagram. Two groups are shown in the diagram—an operating session group 202, and an application group 204. The operating session group 202 is identified by the credentialing information associated with a particular operating session of a computer. For example, the operating session group 202 may be associated with the user ID and password that was used to boot a session in which data was provided to a common data store.

The application group 204 is identified by the particular application that provided data to the common data store. Thus, the intersection 206 of the operating session group 202 and the application group 204 represents the identity of the user of a computer when data was added to the common data store, and the application that added that data. The intersection 206 of the groups is, therefore, the combination that may be needed in order to later access the data. Here, that combination is user A and application A.

Other examples of situations in which access would not be provided to the data are also shown. For example, example 208 shows a request for data during a session started by user A, but where the application requesting information is application B. This combination represents an application seeking access to encrypted data that it did not itself provide to the common data store. It may be that the application is simply searching all of the common data store, and does not seek access to encrypted data. On the other hand, the application may be malicious code seeking to identify information relating to other applications.

Examples 210, 212 show instances in which the same application that provided the data is also the application requesting the data. However, the user credentials indicate that a different user is operating the application than was operating it when the data was added. As a result, the system would block access to the event that was added by the other user (user A) using the application.

Figure 3:
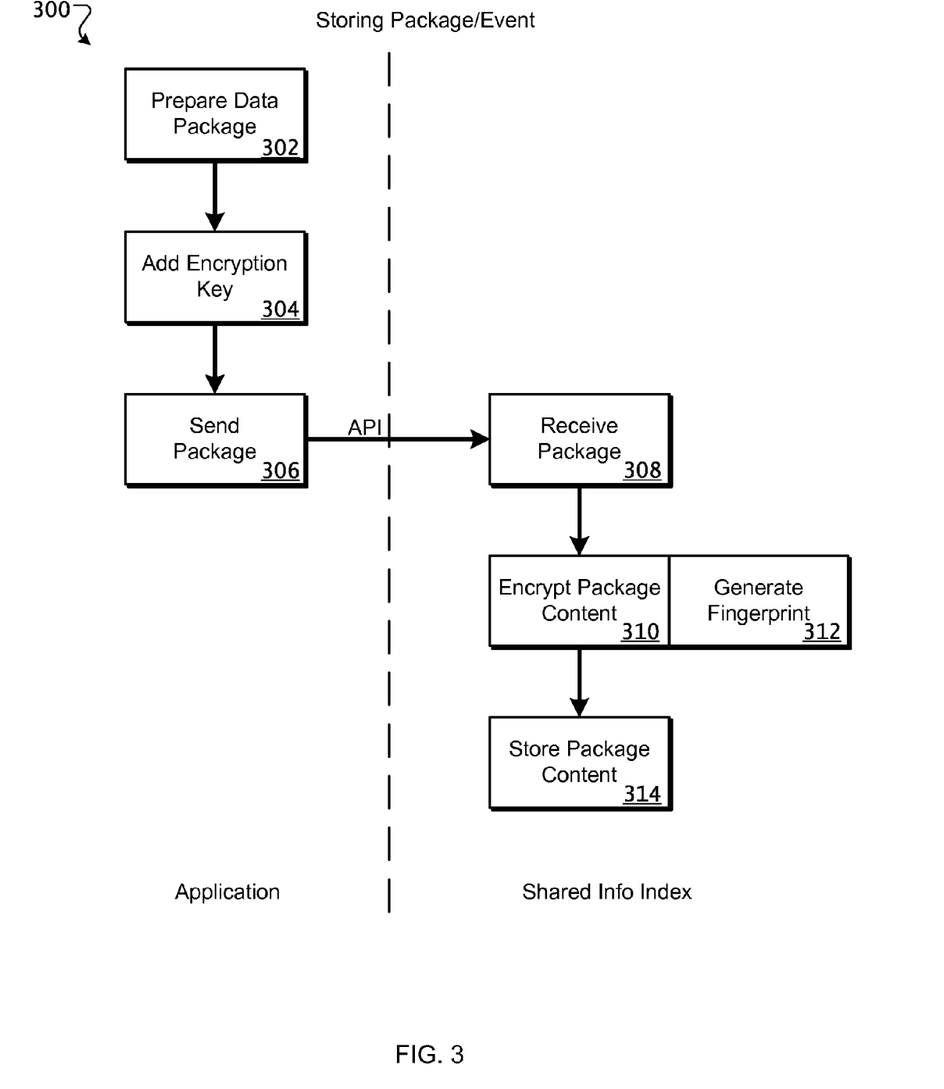
FIG. 3 is a swimlane diagram showing a process for storing data in a common data store.

FIG. 3 is a swimlane diagram 300 showing a process for storing data in a common data store. In the illustrated process, an application having access to a common data store supplies data that is to be encrypted, and a data store, as represented by a shared information Index, encrypts and stores the data. Actions carried out by the application are showing to the left of the figure, while applications carried out by the shared information Index are shown to the right.

The application first prepares a data package, or event, for submission to the shared information index (act 302). The application may then identify an encryption key for the package (act 304), and may send the package to the shared information index (act 306). The encryption key may be sent separately from or with the package, and may be made part of the package, such as in the form of a metadata field in the package. The communication from the application to the shared information index may occur in various formats and by various processes, including by following a published application programming interface (API) approach.

The shared information index may then receive the package (act 308), and may extract appropriate information from the package. For example, the content of the package may be removed, as may the encryption key. The shared information index (such as components of manager 124) may then use the encryption key to encrypt the packaged content (act 310). The shared information index may then store the encrypted content in a common data store (act 314).

For providing access to the encrypted data, fingerprints associated with the encrypted data may also be generated (act 312). The fingerprints may be used by an index to identify matching content in a common data store. A fingerprint may be an equivalent of a word or term in the content, and searching in the index may be performed on the fingerprint rather than on the native word or term. Fingerprints may, in appropriate circumstances, be derived from clear text data or encrypted data. Encrypting terms before generating an associated fingerprint may provide for greater security in appropriate circumstances.

Figure 4:
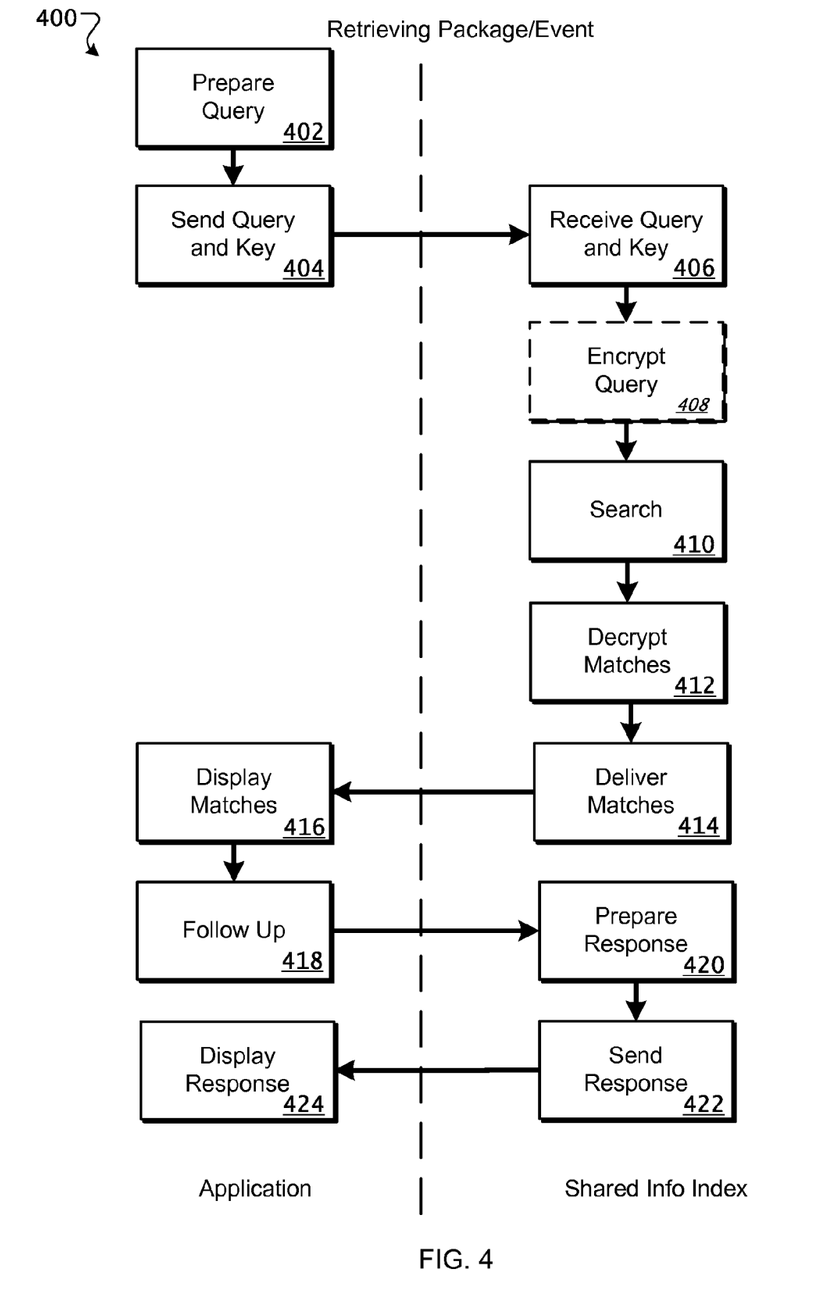
FIG. 4 is a swimlane diagram showing retrieval of data from a common data store.

FIG. 4 is a swimlane diagram 400 showing retrieval of data from a common data store. In general, an application may submit a query along with a key. A shared information index or similar program may search for matches to the query and may use the key to decrypt matches that have been encrypted using the key.

At act 402, and application prepares a query for submission to a shared information Index. The application may also identify a key to be associated with the query. For example, the application may store a copy of the key and may recover the key when making requests. The application may always use the same key, may periodically change keys, may use a particular key for a particular user, may use a particular key for particular functions, or may use a different key each time it provides information to the shared information Index. The application may store the key or keys in a manner that permits for ready identification of the relevant key or keys at a later time. When the appropriate key has been identified, the query and the key may be submitted to the shared information index, either alone or together (act 404).

When the shared information Index has received the query and the key (act 406), it may perform a search (act 410) of the index to locate corresponding data stored in the index. Where fingerprints stored in the index have been encrypted, or are based on encrypted data, the query term may also be encrypted before searching, as shown by optional box 408.

The shared information Index may then associate matches in the index with matches in a main common data storage structure. The system may then decrypt the encrypted matches (act 412) using the key and may deliver some or all the matches (act 414) to the requesting application.

Upon receiving the matching information, the application may display the matches (such as by displaying the HTML content of an event, or displaying titles of a number of matching events in a list) or may display other data relating to a match (such as by operating a portion of the application on a matching XML document). The application may also perform other operations on the returned data, or by using the returned data.

The user of the application may then perform actions that require the application to obtain addition information from the index (act 418), and the index or a program associated with the index may provide responsive information (act 420). Such a response may require further submissions of encryption keys, and subsequent decryption of stored information. The system may then send the application any appropriate response (act 422), and the application may display the response or data related to or generated from the response (act 424).

Figure 5A:
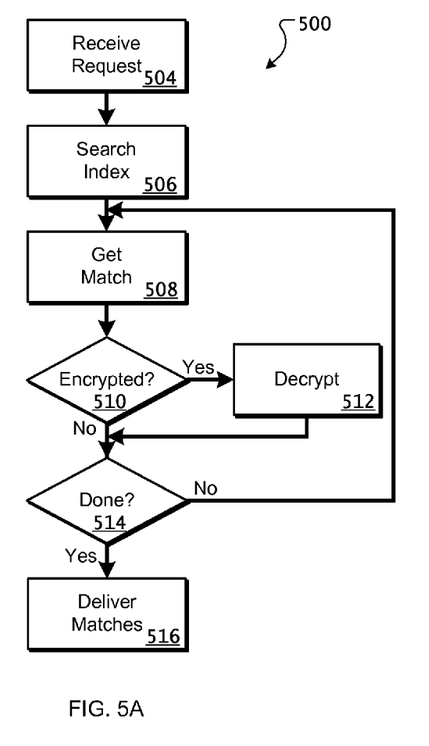
FIGS. 5A-5B are flowcharts showing retrieval of data from a common data store.
Figure 5B:
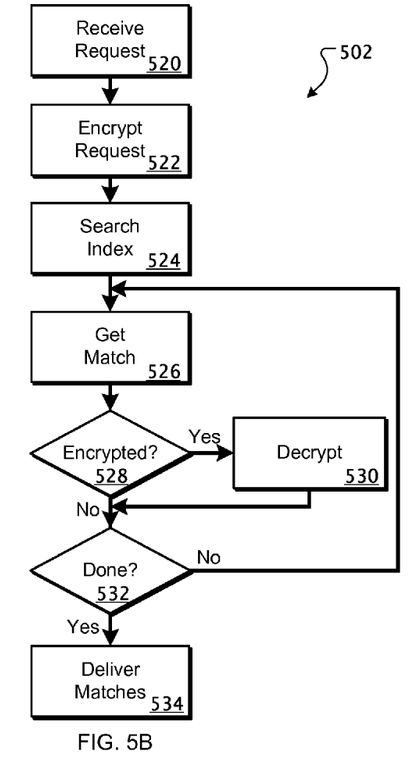

FIGS. 5A-5B are flowcharts 500, 502 showing retrieval of data from a common data store. In general, flowchart 500 shows retrieval where index fingerprints have not been derived from encrypted data, while flowchart shows an alternative implementation that encrypts the data before generating fingerprints from the encrypted data.

At act 504 of flowchart 500, a request is received, such as by a component such as data manager 124 in FIG. 1. The request may be accompanied by an encryption key that may subsequently be used to decrypt any located encrypted content. Alternatively, the process may first identify encrypted content, and may subsequently request the key, so that the key is sent separately from the request. At act 506, the process searches an index, such as an index of fingerprints that each relate to a term in one or more events having stored content.

The search may generate one or more matches (act 508). For each match, the process may then identify the actual content stored in the database, and may retrieve that content. Where the content is encrypted (act 510), the process may obtain and use the key as an input to a decryption process (act 512). The process may continue until all matching events have been located for a request (act 514). The decrypted matches, or related information, may then be delivered back to the requesting application (act 516). Alternatively, information may be returned before all matches have been identified and decrypted.

Flowchart 502 begins when a request is received (act 520). In this example, the stored information was encrypted before indexing, and so the request is encrypted before applying it to the index (act 522). The index may then be searched using the encrypted form of the query (act 524) to generate one or more matches or hits (act 526). As with flowchart 500, any encrypted matches (act 528) may result in the decryption of the corresponding content (act 530), until all matches have been identified (act 532). Before or after all matches have been identified, matches or information relating to matches may be delivered back to a requesting application (act 534).

Figure 6:
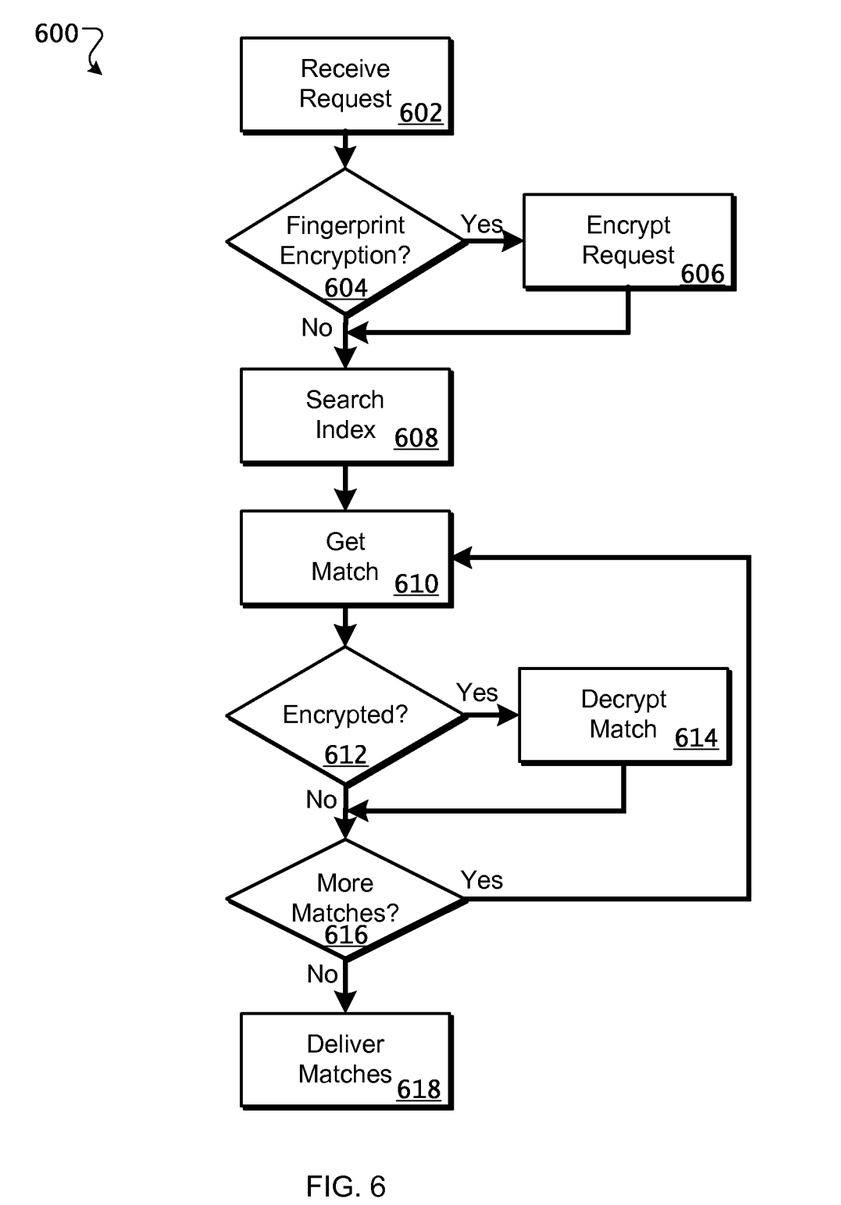
FIG. 6 is a flowchart showing retrieval of data from a common data store.

FIG. 6 is a flowchart showing retrieval of data from a common data store. In this implementation, the process operates whether stored information has been initially encrypted before indexing or not. At act 602, a request is received, as in the other processes. The process may then determine whether, for the particular request or for particular results, the fingerprints in an index relate to encrypted content (act 604). If they do, then the request may be encrypted (after extracting it from the received message) at act 606. The request, whether encrypted or unencrypted, may then be applied to search the index (act 608) and to generate matches (act 610). Where a match is encrypted (act 612), it may be decrypted (act 614), until all matches are identified (act 616), and one or more of the matches (or related information) may be delivered to the requesting application (act 618).

Figure 7:
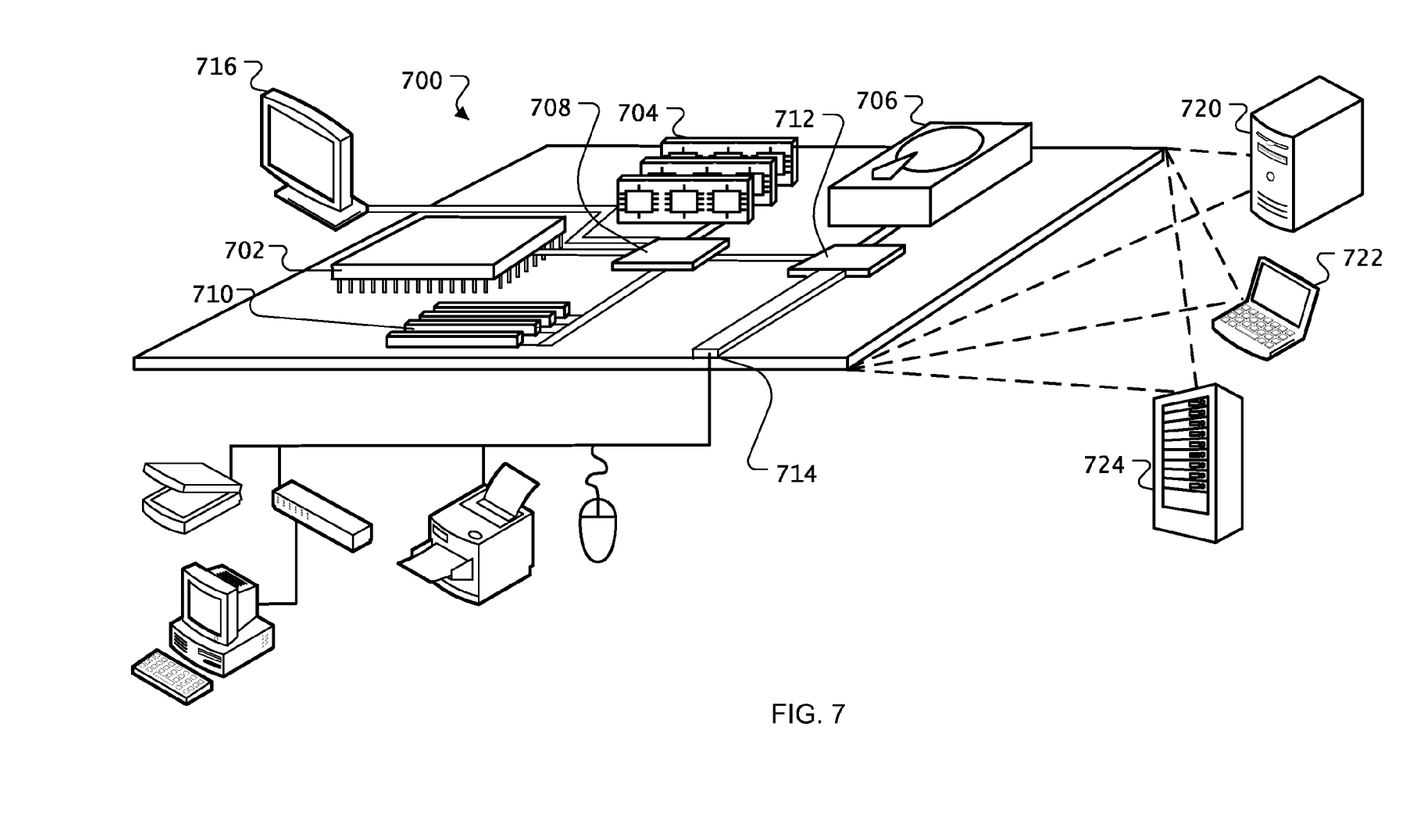
FIG. 7 is a block diagram of a computing devices that may be used to implement the systems and methods described in this document, as either a client or as a server or plurality of servers.

FIG. 7 is a block diagram of a computing devices 700 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the described embodiments. Accordingly, other embodiments are within the scope of the following claims.

What is claimed is:

1. A method comprising:
receiving, by a common data manager executing on a computing device from a first application executing on the computing device, first data in an unencrypted form and a first encryption key, wherein the common data manager is configured to store and index data received from a plurality of independent applications on the computing device, and wherein the plurality of independent applications comprises the first application and a second application that differs from the first application;
generating, by the common data manager and using the first encryption key, an encrypted form of the first data that is received from the first application;
storing, by the common data manager in a data store, the encrypted form of the first data that is received from the first application, wherein the data store is configured to store the data independent of encryption keys for the plurality of independent applications;
receiving, by the common data manager from the second application, a search request that includes (i) a query and (ii) a second encryption key;
encrypting, by the common data manager, one or more query terms of the query included in the search request with the second encryption key included in the search request; and
providing, by the common data manager to the second application, search results in response to the search request, the search results corresponding to matches between the encrypted one or more query terms and encrypted data in the data store.

2. The method of claim 1, wherein the search request comprises a first request, and wherein the method further comprises:

receiving, from a third application, a second request for data and a third encryption key;
encrypting one or more query terms of the second request with the third encryption key; and
determining, based on the encrypted one or more query terms of the second request and the encrypted form of the first data that is received from the first application, that the encrypted form of the first data that is received from the first application is inaccessible to the third application.

3. The method of claim 1, comprising:
comparing the encrypted form of the first data that is received from the first application to the encrypted one or more query terms; and
determining, based on comparing, that the encrypted form of the first data that is received from the first application is encrypted with a same encryption key as the encrypted one or more query terms.

4. The method of claim 1, wherein each of the plurality of independent applications is configured to store data in the data store using a unique encryption key, wherein unique encryption keys for each of the plurality of independent applications promote access to the data by an application that sent the data to the data store and prevent access to the data by other applications.

5. The method of claim 1, wherein the first encryption key is generated by the first application.

6. One or more non-transitory machine-readable media configured to store instructions that are executable by one or more processors to perform operations comprising:
receiving, by a common data manager executing on a computing device from a first application executing on the computing device, first data in an unencrypted form and a first encryption key, wherein the common data manager is configured to store and index data received from a plurality of independent applications on the computing device, and wherein the plurality of independent applications comprises the first application and a second application that differs from the first application;
generating, by the common data manager using the first encryption key, an encrypted form of the first data that is received from the first application;
storing, by the common data manager in a data store, the encrypted form of the first data that is received from the first application, wherein the data store is configured to store the data independent of encryption keys for the plurality of independent applications;
receiving, by the common data manager from the second application, a search request that includes (i) a query and (ii) a second encryption key;
encrypting, by the common data manager, one or more query terms of the query included in the search request with the second encryption key included in the search request; and
providing, by the common data manager to the second application, search results in response to the search request, the search results corresponding to matches between the encrypted one or more query terms and encrypted data in the data store.

7. The one or more non-transitory machine-readable media of claim 6, wherein the operations further comprise:
determining that at least a portion of the encrypted form of the first data that is received from the first application matches at least a portion of the encrypted one or more query terms.

8. The one or more non-transitory machine-readable media of claim 6, wherein the search request comprises a first request, and wherein the operations further comprise:
receiving, from a third application, a second request for data and a third encryption key;
encrypting one or more query terms of the second request with the third encryption key; and
determining, based on the encrypted one or more query terms of the second request and the encrypted form of the first data that is received from the first application, that the encrypted form of the first data that is received from the first application is inaccessible to the third application.

9. The one or more non-transitory machine-readable media of claim 6, wherein each of the plurality of independent applications is configured to store data in the data store using a unique encryption key, wherein unique encryption keys for each of the plurality of independent applications promote access to the data by an application that sent the data to the data store and prevent access to the data by other applications.

10. The one or more non-transitory machine-readable media of claim 6, wherein the first encryption key is generated by the first application.

11. A system comprising:
one or more processors of a computing device; and
one or more machine-readable media configured to store instructions that are executable by the one or more processors to cause the computing device to perform operations comprising:
receiving, by a common data manager executing on the computing device from a first application executing on the computing device, first data in an unencrypted form and a first encryption key, wherein the common data manager is configured to store and index data received from a plurality of independent applications on the computing device, and wherein the plurality of independent applications comprises the first application and a second application that differs from the first application;
generating, by the common data manager using the first encryption key, an encrypted form of the first data that is received from the first application;
storing, by the common data manager in a data store, the encrypted form of the first data that is received from the first application, wherein the data store is configured to store the data independent of encryption keys for the plurality of independent applications;
receiving, by the common data manager from the second application, a search request that includes (i) a query and (ii) a second encryption key;
encrypting, by the common data manager, one or more query terms of the query included in the search request with the second encryption key included in the search request; and
providing, by the common data manager to the second application, search results in response to the search request, the search results corresponding to matches between the encrypted one or more query terms and encrypted data in the data store.

12. The system of claim 11, wherein the operations further comprise:
determining that at least a portion of the encrypted form of the first data that is received from the first application matches at least a portion of the encrypted one or more query terms.

13. The system of claim 11, wherein the search request comprises a first request, and wherein the operations further comprise:
- receiving, from a third application, a second request for data and a third encryption key;
- encrypting one or more query terms of the second request with the third encryption key; and
- determining, based on the encrypted one or more query terms of the second request and the encrypted form of the first data that is received from the first application, that the encrypted form of the first data that is received from the first application is inaccessible to the third application.

14. The method of claim 1, wherein receiving the first data in an unencrypted form and the first encryption key comprises receiving, by the common data manager from the first application executing on the computing device, a storage request that includes first data in an unencrypted form and the first encryption key.

15. The method of claim 1, further comprising generating, by the common data manager, decrypted data from the encrypted data in the data store determined to match the encrypted one or more query terms, the decrypted data being generated using the second encryption key;
- wherein providing, by the common data manager to the second application, search results in response to the request comprises providing, by the common data manager to the second application, the decrypted data generated from the encrypted data in the data store determined to match the encrypted one or more query terms.

16. The method of claim 1, wherein storing, by the common data manager in the data store, the encrypted form of the first data comprises storing, by the common data manager in the data store, the encrypted form of the first data in association with user credential data for a particular user.

17. The method of claim 1, wherein the method further comprises:
- receiving, by the common data manager, user credential data associated with the search request; and
- determining, by the common data manager, that an encrypted data item in the data store that matches the encrypted request is associated with user credential data that matches the user credential data associated with the search request; and
- wherein providing, by the common data manager to the second application, the search results comprises providing, by the common data manager to the second application, a search result corresponding to the encrypted data item based on determining that the encrypted data item is associated with user credential data that matches the user credential data associated with the search request.

18. The method of claim 1, further comprising:
- identifying an encrypted data item in the data store that matches the encrypted one or more query terms; and
- denying access to the identified encrypted data item based on determining that user credential data associated with the identified encrypted data item does not match user credential data associated with the search request.

* * * * *